Feb. 24, 1959

G. L. KALOUSEK 2,875,075

HYDROUS CALCIUM SILICATES

Filed Aug. 8, 1955

INVENTOR.
GEORGE L. KALOUSEK
BY

ATTORNEYS.

United States Patent Office 2,875,075
Patented Feb. 24, 1959

2,875,075

HYDROUS CALCIUM SILICATES

George L. Kalousek, Toledo, Ohio, assignor, by mesne assignments, to Owens-Corning Fiberglas Corporation, a corporation of Delaware Application August 8, 1955, Serial No. 526,850

6 Claims. (Cl. 106—120)

This invention relates to hydrous calcium silicates and particularly to the manufacture of lightweight insulating materials of the hydrous calcium silicate type having reduced shrinkage properties.

It is well known in the art that lightweight insulating materials having good insulating properties at high temperatures on the order of 1000° F. may be made by reacting a mixture of reactive lime, reactive silica and water at elevated temperatures. The density of such a product is controlled by the weight of the water used, the greater the weight of water relative to the weight of the solids, the lighter the density of the product. A procedure for the manufacture of such lightweight insulating materials is described, for example, in the patent to Fraser Re. 23,228, dated May 9, 1950. The ratio of reactive lime to reactive silica in products of this type which are the subject of this invention generally ranges from .7:1 to 1:1. The ratio of water to solids in the mixture for making such products generally ranges from 2:1 to 8:1 by weight.

Such integrated products have found extensive use as insulation for high temperature installations. However, in some instances, particularly where the insulation is dimensionally confined, for example, in pipe insulation, the inherent shrinkage in the product is detrimental and may result in cracking or breaking of the product with accompanying loss in reuse of the insulation. In oil refineries, for example, the insulation is taken off the pipes periodically so the latter can be examined for corrosion damage.

It is therefore an object of this invention to provide an integrated hydrous calcium silicate product having reduced shrinkage, without loss of strength.

I have found that an integrated product having reduced shrinkage without loss of strength may be manufactured by introducing predetermined quantities of calcium chloride ($CaCl_2$) and clay ($Al_2O_3$ and $SiO_2$), the latter preferably in the form of kaolin, into the mixture of reactive lime, reactive silica and water, and thereafter indurating the mixture in an atmosphere of steam at temperatures and pressures of 401° F. and 250 p. s. i. a. or higher. The kaolin, being reactive, contributes both $Al_2O_3$ and $SiO_2$ in the reaction to form the product. I have determined that the amount of calcium chloride should preferably be not greater than 10% based on the total weight of reactive solids and the amount of clay should be greater than 1% and not more than 20%, based on the total weight of reactive solids.

A typical composition including the calcium chloride and kaolin contains the following materials:

| | Lbs. |
|---|---|
| Commercial quicklime | 120.0 |
| Tripoli | 34.6 |
| Diatomite | 129.0 |
| Clay as kaolin | 16.4 |
| Chrysotile asbestos | 75.0 |
| Calcium chloride (dry basis) | 23.2 |
| Total dry solids | 398.2 |

The above materials are mixed with a suitable amount of water, for example, 2250 pounds of water, and are then indurated in an autoclave at pressure and temperature of 401° F. and 250 p. s. i. a. for three hours.

The resultant product has reduced shrinkage characteristics without loss of strength, as compared to a product of the same composition made in a similar manner but without the addition of calcium chloride and kaolin. The strength of the resultant product increases with increased amounts of calcium chloride as shown in the following table:

Table I

| | $CaCl_2$, percent | Kaolin, percent | M. R., p. s. i. | Shrinkage, 550° F. | Percent, at— 1,000° F. |
|---|---|---|---|---|---|
| A | 0 | 0 | 80 | .59 | 1.19 |
| B | 6 | 13.5 | 92 | .36 | .77 |
| C | 8 | 13.5 | 94 | .28 | .56 |
| D | 10 | 13.5 | 101 | .19 | .46 |

As can be seen from this table, not only is the shrinkage reduced by the addition of calcium chloride and kaolin, but, in addition, the strength has been increased. The strength shown in this table is obtained by subjecting a bar of the product to a bending test.

The critical nature of the induration at a temperature and pressure of 401° F. and 250 p. s. i. a., or higher, is shown in the following table:

Table II

| Cycle | | Shrinkage at Temperature of— | | |
|---|---|---|---|---|
| Pressure, p. s. i. a. | Time, Hrs. | 460° F. | 880° F. | 1,180° F. |
| | | Percent | Percent | Percent |
| 150 | 8 | | [1] 1.00 | [1] 1.50 |
| 175 | 6 | [2] 0.42 | [2] 1.03 | [2] 1.50 |
| 200 | 5 | | 2.90 | 2 1.45 |
| 225 | 4 | 2 .48 | 2 .93 | 2 1.43 |
| 250 | 3 | 2 .09 | 2 .47 | 2 1.08 |
| 250 | 3 | 1 .33 | 1.84 | [1] 1.50 |

[1] Did not contain $CaCl_2$.
[2] Contained 8% $CaCl_2$ and 13.5% kaolin.

It will be observed that the product containing no calcium chloride and indurated at 250 p. s. i. a. showed shrinkages comparable to those exhibited by the products containing calcium chloride and indurated at temperatures below 250 p. s. i. a. Products containing calcium chloride and indurated at 250 p. s. i. a. show a marked decrease in shrinkage.

Figure 1:
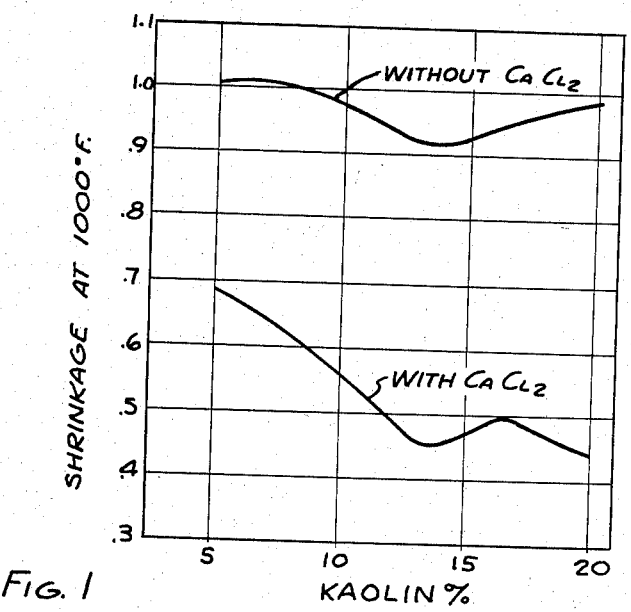
Fig. 1 is a graph showing the variation in shrinkage with varying amounts of kaolin.

The effect of varying amounts of kaolin in the formulation containing calcium chloride is shown in Fig. 1. It will be observed that the shrinkage resulting from the use of calcium chloride is less in each instance than the shrinkage in formulations containing no calcium chloride.

Figure 2:
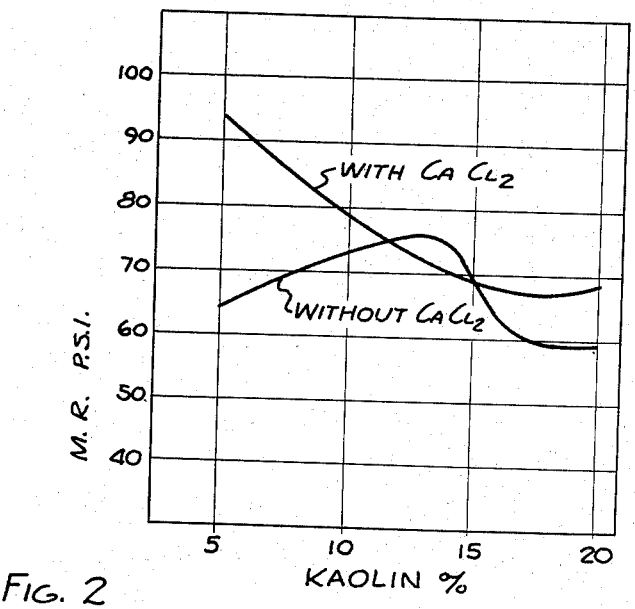
Fig. 2 is a graph showing the variation in strength with varying amounts of kaolin.

The variation in strength with varying amounts of kaolin is shown in Fig. 2. It will be observed that the strength of the product containing calcium chloride is generally greater than the strength of the product containing no calcium chloride. The amount of kaolin should be greater than 1% and not more than 20%. If kaolin is added in amounts greater than 20%, a shrinkage will be observed during induration. In adding kaolin, the silica of this ingredient is counted as a part of the total silica required for the formulation. The term "clay" as used herein is intended to include kaolin, shale-brick rubble, fly ash and any other materials containing the principal ingredients of clay, namely, $Al_2O_3$ and $SiO_2$.

I have generally found that the shrinkage decreases with increased amounts of calcium chloride. However, tests indicate that the maximum amount of calcium chloride that may be accommodated in the crystal lattice is about 10%. Amounts in excess of about 10% may remain as free $CaCl_2$ in the product. Since $CaCl_2$ is readily deliquescent, atmospheric moisture would collect in products containing free $CaCl_2$.

Although I do not wish to be limited by the theory involved, it is believed that the addition of calcium chloride and kaolin produces the desired results in the following manner:

It is believed that the $Al_2O_3$, as the $Al^{3+}$ ion, substitutes for the $Si^{4+}$ ion in the crystal lattice of the hydrous calcium silicate crystals, while the $Cl^{-1}$ ion substitutes for the $OH^{-1}$ ion. The structure containing the $Al^{3+}$ ion, due to the difference in the size and charge brought about by the substitution, is more favorable for holding the relatively large $Cl^{-1}$ ion. Thus, the $Cl^{-1}$ ion is more firmly bound in the structure than is the $OH^{-1}$ ion. Shrinkage is considered to occur due to the removal of the $OH^{-1}$ ion as water at moderate temperatures, for example, between 300° and 1200° F. The presence of a more firmly bound $Cl^{-1}$ ion results in a reduction of shrinkage as contrasted to a hydrous calcium silicate formulation wherein no chloride has been added.

It can thus be seen that I have provided a hydrous calcium silicate product and a method of making said product wherein the shrinkage is substantially reduced without reduction of strength. This is accomplished by adding calcium chloride and kaolin in predetermined amounts to a mixture of reactive lime, reactive silica and water and indurating the mixture at a temperature and pressure of 401° F. and 250 p. s. i. a., or higher.

The addition of calcium chloride and kaolin and induration at a temperature and pressure less than 401° F. and 250 p. s. i. a. will produce some reduction in shrinkage but at the same time the strength of the product will not be maintained.

I claim:
1. The method of making an integrated hydrous calcium silicate product which comprises forming a mixture comprising reactive lime, reactive silica, calcium chloride, clay and water, the ratio of water to solids ranging from 2:1 to 8:1, the ratio of reactive lime to reactive silica ranging from .7:1 to 1:1, the silica of the clay being calculated as a part of the total silica, the amount of calcium chloride being a maximum of 10% based on the total weight of reactive solids, and the amount of clay ranging between 1% and 20% based on the total weight of reactive solids and indurating said mixture at a minimum temperature and pressure of 401° F. and 250 p. s. i. a. to form an integrated hydrous calcium silicate product.

2. The integrated hydrous calcium silicate product made in accordance with the method set forth in claim 1.

3. The method of making an integrated hydrous calcium silicate product which comprises forming a mixture comprising reactive lime, reactive silica, calcium chloride, kaolin and water, the ratio of water to solids ranging from 2:1 to 8:1, the ratio of reactive lime to reactive silica ranging from .7:1 to 1:1, the silica of the kaolin being calculated as a part of the total silica, the amount of calcium chloride being a maximum of 10% based on the total weight of reactive solids, and the amount of kaolin ranging between 1% and 20% based on the total weight of reactive solids and indurating said mixture at a minimum temperature and pressure of 401° F. and 250 p. s. i. a. to form an integrated hydrous calcium silicate product.

4. The integrated hydrous calcium silicate product made in accordance with the method set forth in claim 3.

5. The method of making an integrated hydrous calcium silicate product which comprises forming a mixture comprising quicklime, tripoli, diatomite, kaolin, chrysotile asbestos, calcium chloride and water in the following proportions:

| | Lbs. |
|---|---|
| Commercial quicklime | 120.0 |
| Tripoli | 34.6 |
| Diatomite | 129.0 |
| Clay as kaolin | 16.4 |
| Chrysotile asbestos | 75.0 |
| Calcium chloride (dry basis) | 23.2 | the ratio of water to solids ranging from 2:1 to 8:1, and indurating said mixture at a temperature and pressure of 401° F. and 250 p. s. i. a. to form an integrated hydrous calcium silicate product.

6. The integrated hydrous calcium silicate product made in accordance with the method set forth in claim 5.

References Cited in the file of this patent

UNITED STATES PATENTS

| 1,107,431 | Malinovszky | Aug. 18, 1914 |
| 1,850,845 | Nelson | Mar. 22, 1932 |
| 1,953,924 | Blank | Apr. 10, 1934 |
| 2,215,891 | Thompson et al. | Sept. 24, 1940 |
| 2,554,934 | Ayers | May 29, 1951 |
| 2,665,996 | Kalousek | Jan. 12, 1954 |